United States Patent
Yokota et al.

(10) Patent No.: US 6,835,793 B2
(45) Date of Patent: Dec. 28, 2004

(54) GOLF BALL HAVING A POLYURETHANE COVER

(75) Inventors: Masatoshi Yokota, Kobe (JP); Kaname Yamada, Kobe (JP); Seigou Sakagami, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 27 days.

(21) Appl. No.: 10/303,027

(22) Filed: Nov. 25, 2002

(65) Prior Publication Data

US 2003/0120020 A1 Jun. 26, 2003

(30) Foreign Application Priority Data

Nov. 26, 2001 (JP) ........................................ 2001-359135

(51) Int. Cl.$^7$ .......................... A63B 37/12; A63B 37/06
(52) U.S. Cl. ......................... 528/63; 528/64; 473/374; 473/377; 473/378
(58) Field of Search ..................... 528/63, 64; 473/374, 473/377, 378

(56) References Cited

U.S. PATENT DOCUMENTS

| | | | |
|---|---|---|---|
| 4,884,814 A | | 12/1989 | Sullivan |
| 5,334,673 A | | 8/1994 | Wu |
| 6,465,578 B1 | * | 10/2002 | Bissonnette et al. ........ 525/261 |
| 6,486,261 B1 | * | 11/2002 | Wu et al. ................ 525/332.6 |
| 6,592,472 B2 | * | 7/2003 | Dewanjee ................... 473/378 |
| 2002/0098917 A1 | * | 7/2002 | Iwami ........................ 473/374 |
| 2003/0171166 A1 | * | 9/2003 | Cavallaro et al. ........... 473/371 |

FOREIGN PATENT DOCUMENTS

WO     WO 98/53886 A1     12/1998

OTHER PUBLICATIONS

Thain, Science and Golf IV, pp. 319–326; Jul. 2002.*

* cited by examiner

*Primary Examiner*—David J. Buttner
(74) *Attorney, Agent, or Firm*—Birch, Stewart, Kolasch & Birch, LLP

(57) ABSTRACT

A solid golf ball having a polyurethane cover and containing satisfactory formability and ball properties. The golf ball provides good shot feel, controllability, and resilience by adjusting the hardness and the thickness of the polyurethane cover, and the hardness of the entire golf bal. The formability of the polyurethane cover is improved by controlling the amount of residual isocyanate monomer contained in the isocyanate group-terminated urethane prepolymer.

14 Claims, 1 Drawing Sheet

GOLF BALL HAVING A POLYURETHANE COVER

This nonprovisional application claims priority under 35 U.S.C. § 119(a) on Patent Application No. 2001-359135 filed in JAPAN on Nov. 26, 2002, which is herein incorporated by reference.

BACKGROUND OF THE INVENTION

1. Field of the Invention

The present invention relates to a multi-piece solid golf ball comprising a solid core covered with a polyurethane cover.

2. Description of the Related Art

An ionomer resin cover has been widely used as a cover for a solid golf ball in which a vulcanized rubber sphere is used as a solid core, because of its excellent durability. However, compared to the balata rubber cover, the ionomer resin cover tends to give a far inferior shot feeling to the golfer when hitting the golf ball.

To improve the shot feel of the ionomer resin cover, a cover comprising an ionomer mixture has been proposed in Japanese Patent No. 2,709,950, where a hard ionomer which is a sodium or zinc salt of an olefin-unsaturated carboxylic acid copolymer is mixed with a soft ionomer which is a sodium or zinc salt of an olefin-unsaturated carboxylic acid-unsaturated carboxylic ester terpolymer. The shot feeling can be softened by blending this soft ionomer, but on the other hand, the advantages inherent in the ionomer cover are sacrificed, such as abrasion resistance (scratch resistance) and resilience.

Recently, polyurethane has been focused on as an inexpensive cover material that imparts to the golfer a shot feeling like the balata cover and has greater durability than balata. For example, a polyurethane cover comprising a urethane prepolymer which has been hardened with a slow-reacting polyamine curing agent is disclosed in Japanese Patent No. 2,662,909.

There is a problem in forming the polyurethane cover. The problem is that it is difficult to form the cover because the rapid reaction between the urethane prepolymer and polyamine curing agent results in a precipitous increase in viscosity. Although the slow-reacting polyamine curing agent is used in Japanese Patent No. 2,662,909 to prevent the rapid increase in viscosity resulting from the progress of the reaction between the urethane prepolymer and polyamine curing agent, it is still sometimes difficult to mold the cover, because of the rapid increases in viscosity, depending on the type of urethane prepolymer, type of curing agent, combination thereof, and the like. Even if the cover can be formed, further improvement is also needed, because the resilience, spin performance, and abrasion resistance are not altogether satisfactory.

SUMMARY OF THE INVENTION

In view of the foregoing, an object of the present invention is to provide a solid golf ball having a polyurethane cover, which satisfies the formability and the golf ball properties.

The golf ball of the present invention comprises
a solid core composed of at least one layer, and
a polyurethane cover for covering the solid core, wherein
the polyurethane cover has a thickness of from 0.2 to 0.5 mm, and is formed from a cured urethane composition having Shore D hardness of from 30 to 55;
the urethane composition comprises an isocyanate group-terminated urethane prepolymer and an aromatic polyamine compound; and
the deformation amount of the golf ball is from 2.40 to 3.30 mm when applying a load of from 98N as an initial load to 1275N as a final load to the golf ball.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

Figure 1:
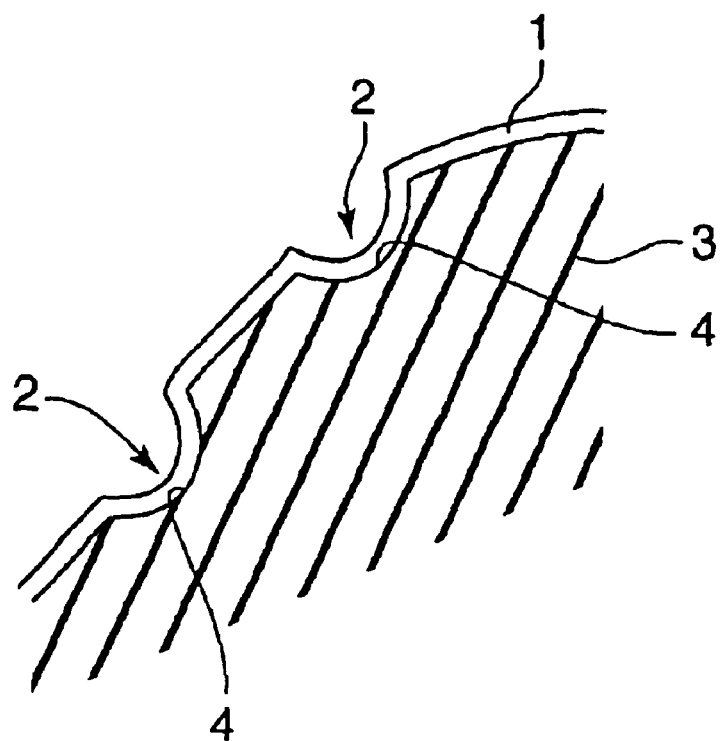
FIG. 1 is an expanded sectional view showing the dimple configuration of the golf ball of the present invention.

The solid golf ball of the present invention is characterized in adjusting the compressive deformation of the golf ball as a whole in addition to specifying the ranges of the hardness and the thickness of the polyurethane cover. The polyurethane cover used in the present invention will be described first. The polyurethane cover used in the present invention is composed of a cured polyurethane composition which comprises an isocyanate group-terminated urethane prepolymer having a residual polyisocyanate monomer content of not more than 0.5 mass % and an aromatic polyamine compound (hereinafter, referred to as "urethane cover composition").

The isocyanate group-terminated urethane prepolymer used in the present invention has at least two isocyanate groups at the urethane prepolymer molecular chain, and has the residual polyisocyanate monomer content of not more than 0.5 mass %. The location of the isocyanate groups in the urethane prepolymer molecular chain is not particularly limited, and may be at the terminal of either the main chain or side chain of the urethane prepolymer molecule. The isocyanate group-terminated urethane prepolymer can be obtained by reacting a polyisocyanate compound with a polyol so that the isocyanate group of the polyisocyanate compound is excess to the hydroxyl group of the polyol in the molar ratio. "The residual polyisocyanate monomer" means an unreacted polyisocyanate compound remaining in the isocyanate group-terminated urethane prepolymer. The content of the residual polyisocyanate monomer in the isocyanate group-terminated urethane prepolymer is defined by (mass of polyisocyanate monomer remaining in the isocyanate group-terminated urethane prepolymer/total mass of the isocyanate group-terminated urethane prepolymer)×100, and can be determined by gas chromatography. A polyisocyanate monomer content over 0.5 mass % tends to result in precipitation in the polyurethane cover composition. Although the mechanism involved in the precipitation is not apparent, it is assumed that the reaction product between the residual polyisocyanate monomer and the polyamine curing agent precipitates. The above precipitation causes a non-uniform reaction between the isocyanate group-terminated urethane prepolymer and the polyamine curing agent, thus making it difficult to produce a uniform polyurethane cover. A non-uniform polyurethane cover will affect the durability of the cover, particularly will lower the abrasion resistance.

The polyisocyanate compound used as a raw material for the isocyanate group-terminated urethane prepolymer is not particularly limited. Examples of the polyisocyanate compound are an aromatic diisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), and para-phenylene diisocyanate (PPDI); and an alicyclic or aliphatic diisocyanate such as 4,4'-dicyclohexylmethane diisocyanate (hydrogenated MDI), hexamethylene diisocyanate (HDI), and isophorone diisocyanate (IPDI). The polyisocyanate compound can be used either alone or in combinations of two or more. Of these, TDI, MDI, PPDI or a mixture thereof are particularly preferable in view of imparting the good mechanical properties to the polyurethane cover, as well as imparting good resilience, weather resistance, and water resistance to the golf ball.

Examples of the polyol used as raw material for the isocyanate group-terminated urethane prepolymer include any low-molecular weight compound or high-molecular weight compound with a plurality of hydroxyl groups. Examples of the low-molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylolpropane, hexanetriol. Examples of the high-molecular weight polyol include a polyether polyol which can be obtained by a reaction between alkylene oxides and an initiator with active hydrogen; a condensed polyester polyol obtained by the condensation of a dibasic acid such as adipic acid and glycol or a triol; a lactone polyester polyol obtained by ring-opening polymerization of a lactam such as ε-caprolactam; a polycarbonate diol synthesized using cyclic diols; and a polymer polyol such as an acrylic polyol obtained by the introduction of suitable hydroxyl groups into an acrylic copolymer. Examples of the polyether polyol include polyoxyethylene glycol (PEG), polyoxypropylene glycol (PPG), and polyoxytetramethylene glycol (PTMG). Examples of the condensed polyester polyol include polyethylene adipate (PEA), polybutylene adipate (PBA), and polyhexamethylene adipate (PHMA); examples of the lactone polyester polyol include poly-ε-caprolactone (PCL). In view of their better resilience and water resistance, the polyether polyol are preferable, and the polyoxytetramethylene glycol is even more preferable.

Accordingly, the isocyanate group-terminated urethane prepolymer is preferably at least one selected from the group consisting of a TDI urethane prepolymer, a MDI urethane prepolymer, and a PPDI urethane prepolymer. Specifically, the TDI urethane prepolymer, the MDI urethane prepolymer, the PPDI urethane prepolymer, a mixture of the TDI urethane prepolymer and the MDI urethane prepolymer, a mixture of the TDI urethane prepolymer and the PPDI urethane prepolymer, a mixture of the MDI urethane prepolymer and the PPDI urethane prepolymer, or a mixture of the TDI urethane prepolymer, the MDI urethane prepolymer and the PPDI urethane prepolymer are preferably used. "TDI urethane prepolymer" means the isocyanate group-terminated urethane prepolymer obtained by a reaction between TDI or TDI-based polyisocyanate compound and a polyol (preferably polyoxytetramethylene glycol). "MDI urethane prepolymer" means the isocyanate group-terminated urethane prepolymer obtained by a reaction between MDI or MDI-based polyisocyanate compound and a polyol (preferably polyoxytetramethylene glycol). "PPDI urethane prepolymer" means the isocyanate group-terminated urethane prepolymer obtained by a reaction between PPDI or a PPDI-based polyisocyanate compound and a polyol (preferably polyoxytetramethylene glycol). Specific examples of the isocyanate group-terminated urethane prepolymer having the residual polyisocyanate monomer content of not more than 0.5 mass % include Adiprene LF900A and LF950A, Adiprene LF800A, and Adiprene LF700D commercially available from Uniroyal Co.

The aromatic polyamine compound used in the present invention means, for example, a compound having at least two amino groups bonded to the aromatic ring, and may include a phenylene diamine type with two or more amino groups bonded to one aromatic ring, or a polyaminobenzene type having two or more aminophenyl groups with one amino group bonded to one aromatic ring. The polyaminobenzene type is preferred because of fewer effects caused by steric hindrance and fewer effects between amino groups. The polyaminobenzene type may include diaminobenzene with two aminophenyl groups directly bonded each other. Alternatively, the polyaminobenzene where the two aminophenyl groups may be bonded via a lower alkylene group or alkylene oxide groups can be also used. Among these, typically preferred is a diaminophenylalkane with two aminophenyl groups bonded via lower alkylene groups, especially preferred is 4,4'-diaminodiphenylmethane or a derivative thereof represented by the following general formula. That is because, in the case of p-isomer and the molecular chain between the aminophenyl groups being not so long, the benzene nuclei in the hard segments can be arranged side-by-side linearly in a plane, and hence it is possible to efficiently make use of the intermolecular cohesive energy between the urethane bonds, urea bonds, and hydrogen bonds of benzene nuclei. As a result, the resilience is improved. In addition, the cover durability and the cover strength such as abrasion resistance tend to be improved.

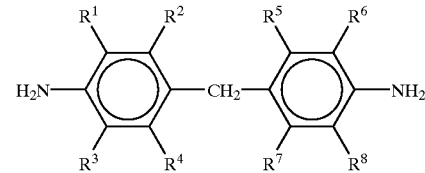

(where $R^1$ to $R^8$ are each an alkyl group having 1 to 9 carbon atoms, halogen atom, or hydrogen atom).

Specific examples of the alkyl group having 1 to 9 carbon atoms include, a linear alkyl group such as methyl, ethyl, n-propyl, n-butyl, n-pentyl, n-hexyl, n-heptyl, n-octyl, and n-nonyl; a branched alkyl group such as iso-propyl, iso-butyl, sec-butyl, tert-butyl, neopentyl; and an alicyclic alkyl group such as cyclopropyl and cyclohexyl. Of these, methyl or ethyl group is preferred because of its lower steric hindrance. Examples of the halogen atom include fluorine, chlorine, bromine, and iodine. Chlorine and bromine are preferred. The $R^1$ to $R^8$ such as alkyl groups and halogen atom may be same or different each other. Examples of the aforementioned 4,4'-diaminodiphenylmethane derivatives include 3,3'-dichloro-4,4'-diaminodiphenylmethane, 3,3'-dimethyl-5,5'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 3,3'-dichloro-5,5'-diethyl-4,4'-diaminodiphenylmethane, 2,2'-dichloro-3,3',5,5'-tetraethyl-4,4'-diaminodiphenylmethane, and 2,2',3,3'-tetrachloro-4,4'-diaminodiphenylmethane. 2,2'- dichloro-3,3',5,5'-tetraethyl-4,4'-diaminodiphenylmethane is particularly preferable because of its low toxicity.

Although the amount of the aromatic polyamine curing agent contained in the urethane cover composition is not particularly limited, the aromatic polyamine compound is preferably blended into the isocyanate group-terminated urethane prepolymer having the residual polyisocyanate monomer content of not more than 0.5 mass %, so that the molar ratio of $NH_2/NCO$ is in the range from 0.85 to 1.15.

The urethane cover composition used in the present invention may contain a well-known catalyst conventionally used in urethane reactions. Examples of the catalyst include a monoamine such as triethylamine, N,N-dimethylcyclohexylamine; a polyamine such as N,N,N',N'-tetramethylethylenediamine, N,N,N',N'',N''-pentamethyldiethylenetriamine; a cyclic diamine such as 1,8-diazabicyclo[5,4,0]-7-undecene (DBU), triethylenediamine; a tin catalyst such as dibutyl tin dilaurate, dibutyl tin diacetate; and an organic carboxylic acid such as azelaic acid, oleic acid, adipic acid. Azelaic acid is preferred.

In addition to the aforementioned isocyanate group-terminated urethane prepolymer and the aromatic polyamine compound, the urethane cover composition may further contain, if necessary, a filler such as barium sulfate, a colorant such as titanium dioxide, and an additive such as a dispersant, an antioxidant, an UV absorbent, a light stabilizer, a fluorescent material, and a fluorescent brightener, as long as the desired properties of the cover are not thereby deteriorated.

The cured urethane cover composition with the aforementioned composition used for the cover of the present golf ball preferably has a Shore D hardness of at least 30, preferably at least 35, and more preferably at least 38 (the hardness of the cured urethane composition is sometimes referred to as "slab hardness"). If the Slab hardness is less than 30, the polyurethane cover will be too soft, resulting in the low resilience. On the other hand, a larger slab hardness means a harder cover. An excessively hard cover results in a golf ball which imparts a hard shot feeling to the golfer and which cannot ensure the satisfactory controllability in approach shots because of too low a spin rate. Therefore, the upper limit of the slab hardness (Shore D hardness) is not more than 55, preferably not more than 52, and more preferably not more than 50.

The polyurethane cover has the thickness of from 0.2 to 0.5 mm, and preferably from 0.3 to 0.4 mm. As the polyurethane cover is getting thick, it loses the elasticity, resulting in the lowered resilience. Thus, the upper limit of the thickness of the polyurethane cover is 0.5 mm. On the other hand, if the thickness of the polyurethane cover is less than 0.2 mm, it will be difficult to form the polyurethane cover, because the polyurethane cover is too thin. Further, there arises another problem in relation to the dimples formed on the surface of the cover. Namely, the dimples are usually formed on the surface of the cover, and the depth thereof is at most about 0.2 mm. When the cover has the thickness of less than 0.2 mm, the core is supposed to be exposed at the bottom of the dimple. Even when the core is not exposed, too thin a cover tends to peel off due to the deformation of the golf ball when hit, resulting in lower durability.

The curing reaction of the urethane cover composition must be carried out in a state where the isocyanate group-terminated urethane prepolymer and the aromatic polyamine compound are mixed homogeneously. Thus the two materials are preferably heated and mixed at such a temperature that the aromatic polyamine compound is in a molten state. For example, the urethane prepolymer is heated to around the temperature where the aromatic amine compound turns into a molten state, and then mixed with the aromatic polyamine compound in a molten state. The mixture may be charged into the mold which is also heated to around the mixing temperature.

The process for producing the cover, without any limitation, may include the following process. Specifically, the urethane cover composition is charged into a hemispherical mold, and cured by heat to obtain a hemispherical polyurethane cover in a gel state. The hemispherical polyurethane cover in a gel state is placed on the solid core held in another core-mold, and then heat-pressed to obtain the intermediate which is covered with the polyurethane cover at the half of the solid core. Subsequently, the urethane cover composition is charged into another mold and partially cured to obtain the hemispherical polyurethane cover in a gel state. The intermediate is covered with the hemispherical polyurethane cover in a gel state at the rest side of the solid core, and then heat-pressed to cover the rest side of the solid core. The cover is preferably formed with a multiplicity of concave dimples, using the mold for the cover, which has a multiplicity of raised portions corresponding to the dimples. Further, the golf ball of the present invention is usually provided with a paint finish, a marking stamp, or the like when launched into the market in order to enhance the attractiveness and commercial value.

In the following, the solid core is described. The solid core used in the present invention may include a solid core composed of at least one layer. Preferable structure of the core is, for example, a single layered structure, or two or more layered structure, which are conventionally used for solid cores in multi-piece solid golf balls, but the following solid core is preferred in combination with the polyurethane cover used in the present invention.

The solid core used in the present invention preferably has a deformation amount, which indicates the softness of the solid core as a whole, of at least 2.40 mm, more preferably at least 2.50 mm, most preferably at least 2.52 mm when applying 98N (10 kgf) as an initial load to 1275N (130 kgf) as a final load to the solid core. The upper limit of the deformation amount is preferably 3.40 mm, more preferably 3.30 mm, and most preferably 3.20 mm. The solid core with the deformation amount smaller than the conventional solid core (namely, relatively hard solid core) is used to ensure durability by controlling the deformation amount against the shot and making the cover hard to peel off, even if the cover is thin.

The solid core of the golf ball of the present invention may include a vulcanized spherical body with a single layered structure, or a solid core which comprises the center of a vulcanized spherical rubber body, at least one layer of an intermediate layer covering the center. The intermediate layer may include, for example, a vulcanized rubber, a thermoplastic resin, a thermoplastic elastomer or a mixture thereof.

As the rubber composition for the core (or the center when the core comprises two layered structure), typically preferred is the rubber composition comprising a diene rubber, an organic peroxide as a crosslinking initiator; a co-crosslinking agent such as an unsaturated carboxylic acid and/or metal salt thereof; and other additives such as specific gravity regulators, if necessary.

Examples of the diene rubber include butadiene rubber (BR), ethylene-propylene-diene terpolymers (EPDM), isoprene rubber (IR), styrene butadiene rubber (SBR), or acrylonitrile butadiene rubber (NBR). Among them, typically preferred is a butadiene rubber, particularly a high cis-polybutadiene rubber having cis-1,4-bonds in a proportion of not less than 40%, preferably not less than 70%, more preferably not less than 90%, in view of the superior resilience.

Examples of the organic peroxide include dicumyl peroxide, 1,1-bis(t-butylperoxy)-3,5-trimethylcyclohexane, 2,5-dimethyl-2,5-di(t-butylperoxy)hexane, and di-t-butyl peroxide, among which dicumyl peroxide is preferred. The organic peroxide is preferably blended in an amount of 0.3 to 3.0 mass parts, and preferably 0.5 to 1.5 mass parts, with respect to 100 mass parts of the diene rubber.

Examples of the unsaturated carboxylic acid include α,β-unsaturated carboxylic acid having $C_3$ to $C_8$ such as acrylic acid or methacrylic acid. Examples of the metal salt thereof include monovalent or divalent metal salt such as zinc or magnesium. The unsaturated carboxylic acid and/or the metal salt thereof are preferably used in an amount of 20 to 50 mass parts, and preferably 25 to 40 mass parts, with respect to 100 mass parts of the diene rubber.

The rubber composition used in the present invention preferably further contains diphenyl disulfide or a derivative thereof represented by the following formula:

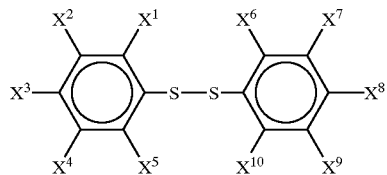

wherein each of $X^1$ to $X^{10}$ is any one selected from the group consisting of a hydrogen atom, a chlorine atom, a bromine atom, an iodine atom, and a cyano group, and $X^1$ to $X^{10}$ may be same or different each other. Although the diphenyl disulfide derivative can have a symmetric or asymmetric structure, it is preferable that the diphenyl disulfide derivative has the symmetric structure (bis-structure). Examples of the diphenyl disulfide derivative are diphenyl disulfide; mono-substituted diphenyl disulfide such as bis(4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide, and bis(4-cyanophenyl) disulfide; di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, bis(2-cyano-5-bromophenyl) disulfide; tri-substituted diphenyl disulfides such as bis(2,4,6-trichlorophenyl) disulfide and bis(2-cyano-4-chloro-6-bromophenyl) disulfide; tetra-substituted diphenyl disulfide such as bis(2,3,5,6-tetrachlorophenyl) disulfide; and penta-substituted diphenyl disulfide such as bis(2,3,4,5,6-pentachlorophenyl) disulfide and bis(2,3,4,5,6-pentabromophenyl) disulfide. Among them, diphenyl disulfide and bis(pentachlorophenyl) disulfide are particularly preferable.

The conditions for the vulcanization should be determined depending on the rubber composition, but the vulcanization is preferably carried out for 10 to 60 minutes at the temperature of 130 to 200° C. in order to obtain the solid core which meets the aforementioned hardness. Alternatively, the vulcanization is preferably carried out for 20 to 40 minutes at the temperature of 130 to 150° C., continuously for 5 to 15 minutes at the temperature of 160 to 180° C.

In the case of the solid core with at least two layered structure, the center, which is made from the above rubber composition, is covered with the intermediate layer. The intermediate layer has no limitation on its raw material and may include, for example, a rubber composition used for the center material, a thermoplastic resin, or a thermoplastic elastomer such as an ionomer. The ionomer may include "Himilan" available from Mitsui-Dupont Co., Surlyn available from Dupont Co., Iotex available from Exxon and the like.

Examples of the thermoplastic elastomer are a polyester thermoplastic elastomer commercially available from DU PONT-TORAY Co., LTD. under the commercial name of "HYTREL", a polyurethane thermoplastic elastomer commercially available from BASF POLYURETHANE ELASTOMERS CO. under the commercial name of "ELASTOLLAN", a polystyrene thermoplastic elastomer available from Kuraray co, under the commercial name of "Septon", and a polyamide thermoplastic elastomer commercially available from Toray Industries, Inc. under the commercial name of "PEBAX". The above thermoplastic elastomer can be used individually or as a mixture of some of them.

As required, the intermediate layer may further include a filler such as barium sulfate, a colorant such as titanium oxide, and an additive such as a dispersant, an antioxidant, an UV absorbent, a light stabilizer, and a fluorescent brightener, in addition to the polymer component such as the rubber, the thermoplastic resin, and the thermoplastic elastomer.

The intermediate layer preferably has the thickness of 0.5 to 4.5 mm, preferably 0.7 to 4.0 mm. If the thickness is less than 0.5 mm, the resilience becomes low, while if the thickness is over 4 mm, the shot feeling is hard. Further, the proportion of the vulcanized rubber center becomes relatively smaller, resulting in the lower resilience.

In the case that the polyurethane cover of the invented golf ball is formed with dimples, as shown in FIG. 1, the dimple 4, which has the similar shape to the dimple 2 of the cover 1, is preferably formed on the surface of the core 3 at the location corresponding to the dimples 2 formed on the cover 1. In the case of the solid core comprising the center and the intermediate layer, the dimples are concavely formed on the surface of the intermediate layer.

Generally, the dimple has the depth of about 0.1 to 0.2 mm. In the present invention, since the cover is very thin, the cover becomes extremely thin at the bottom of the dimple. In the extreme cases, the core is supposed to be exposed. Even if the cover is formed at the bottom of the dimple, a peeling-off or cracking frequently occurs around the extremely thin portion of the cover, resulting in a lowered durability. Therefore, it is preferable to form the dimple at the surface of the core concavely at the same location where the dimples are formed on the cover. This ensures the thickness of the cover at least 0.2 mm even at the bottom of the dimple, thereby ensuring the durability of the cover.

In the case of forming the dimples at the core, the core-mold with the concavity and convexity, which are the same shape of the dimples, can be used. The molds for the core and the cover are formed with the projections holding the position. By holding the core with the projections, it is possible to form the dimples of the cover on the same locations of the dimples at the surface of the core.

The solid golf ball configured as described above, has the deformation amount of at least 2.40 mm, more preferably at least 2.50 mm, and preferably the deformation amount of not more than 3.30 mm, more preferably not more than 3.20 mm when applying a load from 98N (10 kgf) as an initial load to 1275 N (130 kgf) as a final load to the golf ball. Since the cover of the golf ball of the present invention is thin, the peeling off or the crack of the cover tends to occur, due to the impact of hitting the ball. Accordingly, it is necessary to control the deformation amount of the golf ball for ensuring the durability of the cover.

The golf ball of the present invention is usually provided with a paint finish, a marking stamp, or the like when launched into the market in order to enhance the attractiveness and commercial value. The polyurethane paint is preferably used as the finishing paint. The polyurethane paint film preferably has the thickness of not more than 50 μm.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

Measurement and Evaluation

1. Compression Deformation (mm)

The deformation amount (mm) of the golf balls or the solid cores was measured when applying a load from 98N (10 kgf) as an initial load to 1275 N (130 kgf) as a final load to the golf balls or the solid cores.

2. Shore D Hardness of the Cured Urethane Composition or the Intermediate Layer (Slab Hardness)

Each of the urethane cover compositions was formed into sheets each having a thickness of approximately 2 mm by hot-press-molding. The resulting sheets were stored for 2 weeks at 23° C. At least three of the resulting sheets were stacked one upon another, so as to avoid being affected by the measuring substrate on which the sheets were placed, and the stack were subjected to the measurement using a spring-type Shore D hardness tester stipulated in ASTM-D2240.

3. Repulsion Index

Each golf ball was struck with a 198.4 g aluminum cylinder at the speed of 45 m/sec, the speed of the cylinder and the golf ball were respectively measured before and after being struck, and the repulsion coefficient of the golf balls was calculated based on the speeds and weight of the cylinder and the golf balls. The measurement was carried out 5 times, and the average of 5 times was regarded as the repulsion coefficient of the golf ball. The repulsion coefficient of the golf ball was represented as an index relative to the repulsion coefficient of the golf ball No. 12 which is represented as 100. The larger repulsion index means the higher resilience.

4. Spin Rate (rpm)

Each golf ball was hit with a titanium driver (W#1) attached to a swing robot manufactured by Truetemper Co. at the head speed of 45 m/sec, and the spin rate (rpm) was determined by continuously taking a photograph of the spinning golf ball.

Each golf ball was hit with a sand wedge club attached to a swing robot manufactured by Truetemper Co. at the head speed of 20 m/sec, and the spin rate (rpm) was determined by continuously taking a photograph of the spinning golf ball.

5. Flight Distance (Yards)

Each golf ball was hit with a titanium driver (W#1) attached to a swing robot, at the head speed of 45 m/sec. The flight distance from the hitting point to the point where the golf ball fell to the ground was measured.

6. Durability

Each golf ball was hit 150 times repeatedly with a titanium driver (W#1) attached to a swing robot, at the head speed of 45 m/sec. The durability was evaluated based on the following criteria.

Good: The golf ball was able to be hit 150 times, and the crack of the cover was not observed after the 150 time-hit.

Fair: The golf ball was able to be hit 150 times, but the crack of the cover was observed.

Poor: The golf ball was not able to be hit 150 times, because the cover peeled off during the 150-time hit.

7. Shot Feeling

Actual hitting test was conducted by five professional golfers and five non-professional skilled golfers. The shot feeling was evaluated based on the following three criteria. Major result of the ten results was regarded as the shot feeling of the golf ball.

Manufacture of Golf Balls

1. Production of the Golf Balls No.1 to No.12.

The rubber composition shown in Table 1 was vulcanized and formed under the vulcanizing conditions shown in Table 1, to obtain spherical solid cores No.1 to No.12 having a diameter of 39.6 to 42.4 mm. The compressive deformation amount of the solid core was measured.

Each core thus obtained was covered with the urethane cover composition shown in Table 1 for two minutes at 80° C. to obtain the intermediate of which the half of the core is covered. The rest side of the intermediate was set into another hemispherical mold into which the urethane cover composition was charged, and then the urethane cover composition was heat-pressed and cured for 10 minutes at 80° C. The obtained golf ball was discharged from the mold, deburred, painted with a white paint at the surface, and then painted with a clear paint to obtain two piece golf balls No. 1 to No. 12 having a diameter of 42.8 mm and a weight of 45.2 to 45.7 g. The obtained golf balls No.1 to No.12 were evaluated in terms of the compressive deformation amount, repulsion index, durability, flight distance, spin rate, and shot feeling. The results were shown in Table 2.

TABLE 1

| Golf ball No. | 1 | 2 | 3 | 4 | 5 | 6 | 7 | 8 | 9 | 10 | 11 | 12 |
|---|---|---|---|---|---|---|---|---|---|---|---|---|
| Core composition | — | — | — | — | — | — | — | — | — | — | — | — |
| BR18 | 100 | 100 | 100 | 100 | 100 | 100 | 100 | 100 | 100 | 100 | 100 | 100 |
| Zinc acrylate | 36 | 32 | 36 | 40 | 36 | 36 | 28 | 44 | 36 | 36 | 36 | 36 |
| Zinc oxide | 11.0 | 12.4 | 10.9 | 9.4 | 10.9 | 11.0 | 14.0 | 7.8 | 10.4 | 10.9 | 10.9 | 9.4 |
| Diphenyl disulfide | 0.5 | 0.5 | 0.5 | 0.5 | 0.5 | 0.5 | 0.5 | 0.5 | 0.5 | 0.5 | 0.5 | 0.5 |
| Dicumyl peroxide | 0.5 | 0.5 | 0.5 | 0.5 | 0.5 | 0.5 | 0.5 | 0.5 | 0.5 | 0.5 | 0.5 | 0.5 |
| Vulcanizing conditions. (° C.*min) | 160*25 | 160*30 | 160*25 | 160*20 | 160*20 | 160*25 | 160*35 | 160*20 | 160*25 | 160*25 | 160*25 | 160*25 |

TABLE 1-continued

| Golf ball No. | 1 | 2 | 3 | 4 | 5 | 6 | 7 | 8 | 9 | 10 | 11 | 12 |
|---|---|---|---|---|---|---|---|---|---|---|---|---|
| Core properties | — | — | — | — | — | — | — | — | — | — | — | — |
| Diameter (mm) | 42.4 | 42.0 | 42.0 | 42.0 | 42.0 | 42.0 | 42.0 | 42.0 | 41.2 | 42.0 | 42.0 | 39.6 |
| Com. Deformation (mm) | 2.85 | 3.26 | 2.84 | 2.52 | 2.52 | 2.85 | 3.67 | 2.38 | 2.83 | 2.84 | 2.84 | 2.79 |
| Dimples | formed | formed | formed | formed | formed | not formed | formed | formed | formed | formed | formed | not formed |
| Cover composition | — | — | — | — | — | — | — | — | — | — | — | — |
| Adiprene LF800A | — | — | — | — | — | — | — | — | — | 100 | — | — |
| Adiprene LF900A | — | — | — | — | 100 | — | — | — | — | — | — | — |
| Adiprene LF950A | 100 | 100 | 100 | 100 | — | 100 | 100 | 100 | 100 | — | — | — |
| Adiprene LF600D | — | — | — | — | — | — | — | — | — | — | 100 | — |
| Ethacure 300 | 14.6 | 14.6 | 14.6 | 14.6 | 9.1 | 14.6 | 14.6 | 14.6 | 14.6 | 6.9 | 17.5 | — |
| Surlyn 8120 | — | — | — | — | — | — | — | — | — | — | — | 50 |
| Himilan 1855 | — | — | — | — | — | — | — | — | — | — | — | 50 |
| Titanium oxide | 2 | 2 | 2 | 2 | 2 | 2 | 2 | 2 | 2 | 2 | 2 | 2 |
| Cover properties | — | — | — | — | — | — | — | — | — | — | — | — |
| Thickness (mm) | 0.2 | 0.4 | 0.4 | 0.4 | 0.4 | 0.4 | 0.4 | 0.4 | 0.8 | 0.4 | 0.4 | 1.6 |
| Slab hardness (Shore D) | 48 | 48 | 48 | 48 | 39 | 48 | 48 | 48 | 48 | 28 | 57 | 50 |

Composition: Parts by mass
Note on Table 1:
BR-18: High cis polybutadiene(cis content: 96%) available from JSR Co.
Zinc acrylate: "ZNDA-90S" produced by Nihon-Zyouryu Co.
Zinc oxide: "Ginrei R" produced by Toho-Zinc Co.
Diphenyl disulfide: Diphenyl disulfide produced by Sumitomo Seika Co.
Dicumyl peroxide: "Percumyl D" produced by Nippon Fats & Oil.
Adiprene LF900A: TDI (NCO content = 3.8%)-PTMG prepolymer having not more than 0.1% of free TDI, available from Uniroyal Co.
Adiprene LF950A: TDI (NCO content = 6.1%)-PTMG prepolymer having not more than 0.1% of free TDI, available from Uniroyal Co.
Adiprene LF800A: TDI (NCO content = 2.9%)-PTMG prepolymer having not more than 0.1% of free TDI, available from Uniroyal Co.
Adiprene LF600D: TDI (NCO content = 7.3%)-PTMG prepolymer having not more than 0.1% of free TDI, available from Uniroyal Co.
Ethacure 300: a curing agent available from Albemalre Co; a mixture of dimethylthio-2,4-toluenediamine and dimethylthio-2,6-toluenediamine having amine value of 530 mgKOH/g.
Surlyn 8120: an ionomer neutralized with sodium produced by Dupont Co.
Himilan 1855: an ionomer neutralized with zinc produced by Mitsui-Dupont polychemicals Co.

TABLE 2

| Golfball No. | 1 | 2 | 3 | 4 | 5 | 6 | 7 | 8 | 9 | 10 | 11 | 12 |
|---|---|---|---|---|---|---|---|---|---|---|---|---|
| Com. Deformation (mm) | 2.82 | 3.21 | 2.79 | 2.47 | 2.81 | 2.80 | 3.62 | 2.33 | 2.73 | 2.82 | 2.75 | 2.67 |
| Repulsion index | 110 | 103 | 108 | 112 | 106 | 108 | 100 | 114 | 104 | 105 | 109 | 100 |
| Durability | Good | Good | Good | Good | Good | Fair | Poor | Good | Good | Good | Good | Good |
| Flight distance (yards) | 238 | 228 | 235 | 232 | 230 | 235 | 223 | 225 | 225 | 221 | 239 | 222 |
| Spin rate (rpm) | — | — | — | — | — | — | — | — | — | — | — | — |
| Driver (W#1) | 2900 | 2850 | 3050 | 3200 | 3250 | 3050 | 2600 | 3450 | 3300 | 3400 | 2800 | 3400 |
| Sand wedge | 7000 | 6900 | 7000 | 7100 | 7200 | 7000 | 6800 | 7200 | 7000 | 7400 | 6500 | 6500 |
| Shot feeling | Good | Good | Good | Good | Good | Good | Poor | Poor | Fair | Poor | Poor | Poor |
| (note of shot feeling) | — | — | — | — | — | — | heavy non elastic | hard | hard non elastic | heavy | hard | hard |

In the golf balls No.3 and No.9, the polyurethane cover material with the almost same hardness were used, and the hardness of the golf ball as a whole (compressive deformation amount) was adjusted in the same degree by controlling the hardness of the solid core. However, comparison between the golf balls No.3 and No.9 indicates that the shot feeling showed a tendency to become hard, and the resilience showed a tendency to be low, when the cover had the thickness over 0.5 mm (No.9).

In the golf balls No.2 to No.5, No.7, and No.8, the polyurethane cover material with the almost same hardness were used, and the urethane covers had the same thickness. However, when the compressive deformation amount of the whole golf ball is less than 2.4 mm (No.8), the shot feeling became bad. On the other hand, as the golf ball is getting soft as a whole, the resilience is getting lowered. Thus, if the deformation amount is over 3.3 mm (No.7), the resilience of the polyurethane cover was as almost same as that of the ionomer cover, and the shot feeling was heavy, as well as the durability of the cover was lowered.

The golf balls No.3 and No. 10 have the same core and the polyurethane cover with the same thickness. However, when the hardness of the polyurethane cover material is less than 30 (No.10), the flight distance was not so long due to the higher spin rate and the shot feeling was also heavy. On the other hand, even if the cores and the thickness of the polyurethane cover are same, when the hardness of the polyurethane cover material is over 55 (No.11), the shot feeling was hard, and the spin rate when hit with the sand wedge was too low, resulting in the low controllability.

In the case of the golf ball No.6, the dimples were not formed on the surface of the core, even though the same polyurethane cover materials were used, and the polyurethane cover had the same thickness. In this case, the repeated hit caused the crack of the cover, and the durability of the cover was slightly low, though the resilience, shot feeling, and the spin rate were in the same degree.

2. Production of the Golf Balls No.21 to No.24.

The center composition shown in Table 3, was vulcanized according to the conditions shown in Table 3 to obtain the centers No. 21 to 24. These centers were covered with the composition for the intermediate layer shown in Table 3 to mold the core. In molding the core, the composition for the intermediate layer was molded into the shape of the half cup shells, and then the center was covered with these half cup shells. The compressive deformation amount of the obtained core was evaluated according to the aforementioned method. Then, the obtained cores were covered with the cover composition shown in Table 3, in the same way of the golf ball No.1 to obtain three-piece golf balls No.21 to No.24. In table 3, Himilan 1605 is an ionomer neutralized with sodium, available from Mitsui-Dupont polychemicals Co. The obtained golf balls were evaluated in terms of the compressive deformation amount, repulsion index, flight distance, shot feeling, and spin rate. The results were shown in Table 3. The result of the golf ball No.3 was also shown for reference.

TABLE 3

| Golf ball No. | 3 | 21 | 22 | 23 | 24 |
|---|---|---|---|---|---|
| Center | — | — | — | — | — |
| BR18 | 100 | 100 | 100 | 100 | 100 |
| Zinc acrylate | 36 | 34 | 34 | 30 | 30 |
| Zinc oxide | 10.9 | 15.6 | 15.0 | 13.3 | 12.8 |
| Diphenyl disulfide | 0.5 | 0.5 | 0.5 | 0.5 | 0.5 |
| Dicumyl peroxide | 0.5 | 0.5 | 0.5 | 0.5 | 0.5 |
| Vulcanizing Condition (° C.*min.) | 160*25 | 160*25 | 160*25 | 160*30 | 160*30 |
| Diameter (mm) | 42.0 | 40.0 | 39.2 | 32.0 | 31.2 |
| Intermediate layer | — | — | — | — | — |
| BR18 | — | — | — | 100 | 100 |
| Zinc acrylate | — | — | — | 40 | 40 |
| Zinc oxide | — | — | — | 9.4 | 9.4 |
| Diphenyl disulfide | — | — | — | 0.5 | 0.5 |
| Dicumyl peroxide | — | — | — | 0.5 | 0.5 |
| Himilan 1605 | — | 100 | 100 | — | — |
| Vulcanizing Condition (° C.*min.) | — | — | — | 160*20 | 160*20 |
| Thickness (mm) | — | 1.0 | 1.0 | 5.0 | 5.0 |
| Shore D hardness | — | 67 | 67 | 60 | 60 |
| Core | — | — | — | — | — |
| Diameter (mm) | 42.0 | 42.0 | 41.2 | 42.0 | 41.2 |
| Com. Deformation (mm) | 2.84 | 2.84 | 2.80 | 2.79 | 2.76 |
| Dimple | formed | formed | formed | formed | Formed |
| Cover | — | — | — | — | — |
| Adiprene LF950 | 100 | 100 | 100 | 100 | 100 |
| Ethacure 300 | 14.6 | 14.6 | 14.6 | 14.6 | 14.6 |
| Titanium oxide | 2 | 2 | 2 | 2 | 2 |
| Thickness (mm) | 0.4 | 0.4 | 0.8 | 0.4 | 0.8 |
| Slab hardness (Shore D) | 48 | 48 | 48 | 48 | 48 |
| Evaluation | — | — | — | — | — |
| Com. Deformation (mm) | 2.79 | 2.77 | 2.69 | 2.74 | 2.65 |
| Repulsion index | 108 | 105 | 102 | 109 | 104 |
| Durability | Good | Good | Good | Good | Good |
| Flight distance (yards) | 235 | 236 | 226 | 235 | 225 |
| Spin rate (rpm) | — | — | — | — | — |
| Driver (W#1) | 3050 | 2800 | 2900 | 3000 | 3050 |
| Sand wedge | 7000 | 6800 | 6700 | 7000 | 7000 |
| Shot feeling | Good | Good | Fair*1) | Good | Fair*1) |

Formulation: parts by mass
*1) Slightly hard shot feeling

In the golf balls No.21 and No.22, the same intermediate layer and the same cover material were used, and the deformation amounts as the whole golf ball were in the same degree. However, comparison between the golf ball No.21 and No. 22 indicated that the shot feeling showed a tendency to become hard and the resilience showed a tendency to become low when the cover had the thickness over 0.5 mm. Comparison between the golf balls No.23 and No. 24 also gave the same result.

The golf ball of the present invention provides the good shot feeling, the controllability, and the resilience by adjusting the hardness and the thickness of the polyurethane cover, and the hardness of the whole golf ball. In addition, the formability of the polyurethane cover has been improved, in particular, the uniform and thin polyurethane cover can be formed by controlling the amount of residual isocyanate monomer contained in the urethane prepolymer. Thus, the polyurethane cover with high quality is obtained.

Further, the dimples, having the same shape of the dimples of the cover, are formed concavely at the surface of the core and at the same location where the dimples of the cover are formed, thus it is possible to impart the durability against the repeated shots, even if the cover is durability against the repeated shots, even if the cover is thin.

This application is based on Japanese Patent application No. 2001-359135 filed on Nov. 26, 2001, the contents of which are hereby incorporated by reference.

What is claimed is:

1. A golf ball comprising
  a solid core having multiple dimples formed on the surface thereof, and composed of at least one layer, and
  a polyurethane cover for covering the solid core, said cover having multiple dimples, the dimples formed on the surface of the solid core being provided at locations corresponding to where the dimples of the cover are located, and the dimples of the solid core have the same shape as the dimples of the cover, wherein
  the polyurethane cover has a thickness of from 0.2 to 0.5 mm, and is formed from a cured urethane composition having Shore D hardness of from 30 to 55;
  the urethane composition comprises an isocyanate group-terminated urethane prepolymer and an aromatic polyamine compound; and
  the deformation amount of the golf ball is from 2.40 to 3.30 mm when applying a load of from 98N as a initial load to 1275N as a final load to the golf ball.

2. The golf ball according to claim 1, wherein the polyurethane cover has a thickness of from 0.3 to 0.4 mm.

3. The golf ball according to claim 1, wherein the cured urethane composition has a Shore D hardness of from 38 to 50.

4. The golf ball according to claim 1, wherein the deformation amount is from 2.50 to 3.20 mm when applying a load of from 98N as an initial load to 1275N as a final load, to the golf ball.

5. The golf ball according to claim 1, wherein the solid core has a deformation amount of from 2.40 mm to 3.40 mm when applying a of load from 98 N as a initial load to 1275 N as a final load, to the solid core.

6. The golf ball according to claim 1, wherein the isocyanate group-terminated urethane prepolymer is at least one member selected from the group consisting of a TDI polyurethane prepolymer, a MDI polyurethane prepolymer, and a PPDI urethane prepolymer, and has a residual polyisocyanate monomer content of not more than 0.5 mass %.

7. The golf ball according to claim 1, wherein the aromatic polyamine compound is 4,4'-diaminodiphenylmethane or a derivative thereof represented by the following general formula,

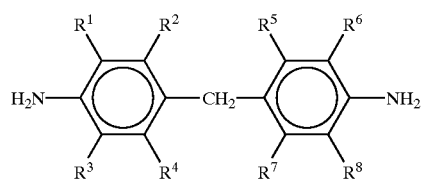

(where $R^1$ to $R^8$ is each independently an alky group having 1 to 9 carbon atoms, a halogen atom, or a hydrogen atom).

8. The golf ball according to claim 7, wherein the aromatic polyamine compound is 2,2'-dichloro-3,3',5,5'-tetraethyl-4,4'-diaminodiphenylmethane.

9. The golf ball according to claim 1, wherein the solid core is made from a rubber composition which comprises a diene rubber and diphenyldisulfide or a derivative thereof represented by the following formula:

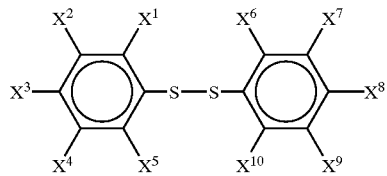

(wherein each of $X^1$ to $X^{10}$ is any one member selected from the group consisting of a hydrogen atom, a chlorine atom, a bromine atom, an iodine atom, and a cyano group, and $X^1$ to $X^{10}$ may be the same or different from each other).

10. The golf ball according to claim 9, wherein the solid core comprises bis(pentachlorophenyl) disulfide.

11. The golf ball according to claim 1, wherein the solid core is composed of one layer and the golf ball is a two-piece golf ball.

12. The golf ball according to claim 1, wherein the solid core is composed of two layers, and the golf ball is a three-piece golf ball.

13. A two-piece golf ball comprising:
   a solid core having dimples formed on the surface thereof, and a polyurethane cover for covering the solid core,
   wherein the polyurethane cover has a thickness of from 0.2 to 0.4 mm, and is formed from a cured urephane compostion having Shore D hardness of from 30 to 55;
   the urethane composition comprises an isocyanate group-terminated urethane prepolymer and an aromatic polyamine compound; and
   the deformation amount of the golf ball is from 240 to 3.30 mm when applying a load of from 98N as an initial load to 1275N as a final load to the golf ball.

14. The two-piece golf ball according to claim 13, wherein the polyurethane cover has the thickness of from 0.3 to 0.4 mm.

* * * * *